(12) United States Patent
Franklin et al.

(10) Patent No.: US 10,390,255 B2
(45) Date of Patent: Aug. 20, 2019

(54) METHOD AND APPARATUS OF DYNAMICALLY ADJUSTING BIT RATE OF BEARER IN WIRELESS COMMUNICATION SYSTEM

(71) Applicant: Samsung Electronics Co., Ltd., Gyeonggi-do (KR)

(72) Inventors: Antony Franklin, Gyeonggi-do (KR); Youngjoong Mok, Gyeonggi-do (KR); Cheolgi Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 14/645,199

(22) Filed: Mar. 11, 2015

(65) Prior Publication Data

US 2015/0264596 A1 Sep. 17, 2015

(30) Foreign Application Priority Data

Mar. 11, 2014 (KR) .......................... 10-2014-0028561

(51) Int. Cl.
*H04W 28/02* (2009.01)
*H04L 12/825* (2013.01)
*H04L 12/841* (2013.01)

(52) U.S. Cl.
CPC ....... *H04W 28/0257* (2013.01); *H04L 47/263* (2013.01); *H04L 47/28* (2013.01); *H04W 28/0268* (2013.01); *H04W 28/0278* (2013.01)

(58) Field of Classification Search
CPC ......... H04W 28/0257; H04W 28/0268; H04W 28/0278; H04L 47/263; H04L 47/28
See application file for complete search history.

(56) References Cited

U.S. PATENT DOCUMENTS

| 6,889,050 | B1 * | 5/2005 | Willars | H04L 47/10 370/329 |
| 7,408,880 | B2 * | 8/2008 | Xiao | H04L 1/0015 370/235 |
| 2002/0155853 | A1 * | 10/2002 | Lee | H04L 1/0009 455/522 |
| 2003/0125037 | A1 * | 7/2003 | Bae | H04W 28/22 455/450 |

(Continued)

FOREIGN PATENT DOCUMENTS

WO WO 2012141480 A2 * 10/2012 ............ H04W 48/20

*Primary Examiner* — Mandish K Randhawa

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method and apparatus of dynamically operating a bearer in a wireless communication system is provided. The bearer operating method of an evolved Node B (eNodeB) includes: setting a dynamic bear for user equipment (UE) where a bit rate is dynamically adjustable; receiving a report message, including channel status and/or video buffer status of the UE, from the UE; determining a modified bit rate to be applied to the dynamic bearer and time information to which the modified bit rate is applied; and transmitting the modified bit rate and the time information to the UE.

16 Claims, 12 Drawing Sheets

(56) References Cited

U.S. PATENT DOCUMENTS

| | | | |
|---|---|---|---|
| 2009/0161545 A1* | 6/2009 | Ho | H04L 47/225 |
| | | | 370/235 |
| 2012/0147766 A1* | 6/2012 | Kim | H04W 24/10 |
| | | | 370/252 |
| 2013/0091248 A1 | 4/2013 | Viswanathan et al. | |
| 2013/0114497 A1* | 5/2013 | Zhang | H04W 72/005 |
| | | | 370/312 |
| 2015/0078295 A1* | 3/2015 | Mandyam | H04L 65/1003 |
| | | | 370/329 |
| 2015/0229970 A1* | 8/2015 | Ma | H04L 47/20 |
| | | | 370/260 |
| 2016/0127954 A1* | 5/2016 | Zhou | H04W 28/22 |
| | | | 370/231 |

* cited by examiner

METHOD AND APPARATUS OF DYNAMICALLY ADJUSTING BIT RATE OF BEARER IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed on Mar. 11, 2014 in the Korean Intellectual Property Office and assigned Serial No. 10-2014-0028561, the entire disclosure of which is hereby incorporated by reference.

TECHNICAL FIELD

The present application relates to wireless communication systems, and more particularly, to a method and apparatus of dynamically adjusting a bit rate of a bearer in a wireless communication system.

BACKGROUND

Mobile communication systems have been developed to provide a voice service to users while they are moving. In recent years, mobile communication systems have been developed to provide data services at a high speed. With the increase in services for users, mobile communication systems need more system resources. Mobile communication systems are also required to be advanced as users demand services at a higher speed.

In order to comply with users' demands, Long Term Evolution (LTE) has been developed as a next generation communication system and is standardized in the 3rd Generation Partnership Project (3GPP). LTE is a technology to implement high speed packet-based communication.

Also, To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To this end, various proposals have been discussed. As an example, a scheme has been proposed to reduce the number of nodes on communication paths by simplifying network architecture. Another scheme has been proposed to apply wireless protocols to wireless channels.

In order to provide a video service to users, LTE defines Guaranteed Bit Rate (GBR) bearer to adjust Quality of Service (QoS) for video flow that needs to guarantee a bit rate.

GBR traffic includes parameters, such as Guaranteed Bit Rate (GBR), Maximum Bit Rate (MBR), Allocation and Retention Priority (ARP), etc. GBR indicates a bit rate that needs to be guaranteed on the network. MBR is a parameter used for a resource type and indicates the maximum bit rate allowable on the network. ARP is a parameter to indicate whether to create a new bearer with removal of an existing bearer or to decline the creation of a new bearer.

When GBR and the corresponding parameters are statically used, the efficiency of the entire network is rapidly decreased according to the congestion of the network or the state of buffer of UE. This causes QoS or Quality of Experience (QoE) to deteriorate.

SUMMARY

To address the above-discussed deficiencies, it is a primary object to provide a method and apparatus of dynamically changing a property of a bearer.

The present disclosure further provides a method and apparatus for dynamically adjusting the GBR for a bearer.

Certain embodiments of the present disclosure provide a method for operating a bearer by user equipment (UE) in a wireless communication system including: setting a dynamic bearer where a bit rate is dynamically adjustable; transmitting a report message, including channel status and/or video buffer status of the UE, to an evolved Node B (eNodeB); receiving a modified bit rate to be applied to the dynamic bearer and time information to which the modified bit rate is applied from the eNodeB; and receiving traffic through the dynamic bearer according to the modified bit rate for the time period corresponding to the time information.

Certain embodiments of the present disclosure provide a method for operating a bearer by an evolved Node B (eNodeB) in a wireless communication system including: setting a dynamic bearer for user equipment (UE) where a bit rate is dynamically adjustable; receiving a report message, including channel status and/or video buffer status of the UE, from the UE; determining a modified bit rate to be applied to the dynamic bearer and time information to which the modified bit rate is applied; and transmitting the modified bit rate and the time information to the UE.

Certain embodiments of the present disclosure provide a method for operating a bearer by user equipment (UE) in a wireless communication system including: setting a dynamic bearer, where a bit rate is dynamically adjustable; detecting channel status and/or video buffer status of the UE; determining a modified bit rate to be applied to the dynamic bearer and time information to which the modified bit rate is applied, based on the detection result; and transmitting a bit rate modification request message, including the determined modified bit rate and the time information, to an evolved Node B (eNodeB).

Certain embodiments of the present disclosure provide a method for operating a bearer by an evolved Node B (eNodeB) in a wireless communication system including: setting a dynamic bearer for user equipment (UE) where a bit rate is dynamically adjustable; receiving a bit rate modification request message, including channel status and/or video buffer status of the UE, from the UE; determining a modified bit rate and time information; and transmitting an acknowledgement message including the modified bit rate and the time information according to the determination result to the UE.

Certain embodiments of the present disclosure provide a user equipment (UE) for dynamically operating a bearer in a wireless communication system including: a transceiver that transmits and receives signals; and a controller configured to: set a dynamic bearer where a bit rate is dynamically adjustable; transmit a report message that includes channel status and/or video buffer status of the UE, to an evolved Node B (eNodeB); receive a modified bit rate to be applied to the dynamic bearer and time information to which the modified bit rate is applied from the eNodeB; and receive traffic through the dynamic bearer according to the modified bit rate for the time period corresponding to the time information.

Certain embodiments of the present disclosure provide an evolved Node B (eNodeB) for dynamically operating a bearer in a wireless communication system including: a transceiver that transmits and receives signals; and a controller configured to: set a dynamic bearer for user equipment (UE) where a bit rate is dynamically adjustable; receive a report message that includes channel status and/or video buffer status of the UE, from the UE; determines a modified bit rate to be applied to the dynamic bearer and time information to which the modified bit rate is applied; and transmits the modified bit rate and the time information to the UE.

Certain embodiments of, the present disclosure provide a user equipment (UE) for dynamically operating a bearer in a wireless communication system including: a transceiver that transmits and receives signals; and a controller configured to: set a dynamic bearer where a bit rate is dynamically adjustable; detect channel status and/or video buffer status of the UE; determine a modified bit rate to be applied to the dynamic bearer and time information to which the modified bit rate is applied, based on the detection result; and transmits a bit rate modification request message including the determined modified bit rate and the time information, to an evolved Node B (eNodeB).

Certain embodiments of the present disclosure provide an evolved Node B (eNodeB) of dynamically operating a bearer in a wireless communication system including: a transceiver that transmits and receives signals; and a controller configured to: set a dynamic bear for user equipment (UE) where a bit rate is dynamically adjustable; receive a bit rate modification request message, include channel status and/or video buffer status of the UE, from the UE; determine a modified bit rate and time information; and transmit an acknowledgement message including the modified bit rate and the time information according to the determination result to the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
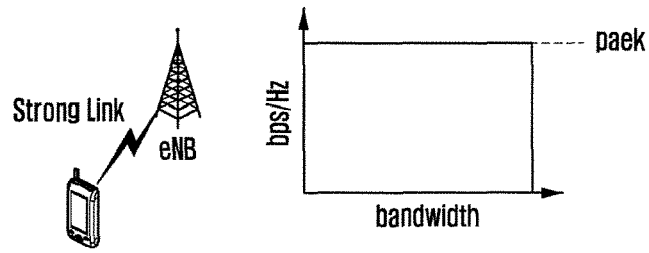
FIGS. 1A, 1B and 1C are views that describe operations of a wireless communication system at a variable bit rate.

FIGS. 1A through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, exemplary embodiments of the present disclosure are described in detail with reference to the accompanying drawings. The same reference numbers are used throughout the drawings to refer to the same or similar parts.

Detailed descriptions of well-known functions and structures incorporated herein may be omitted to avoid obscuring the subject matter of the disclosure.

Although the drawings represent an embodiment of the disclosure, the drawings are not necessarily to scale and certain features may be exaggerated or omitted in order to better illustrate and explain the disclosure. The same reference numbers are used throughout the drawings to refer to the same or similar parts.

The features and advantages of the disclosure and the method to achieve them will become more apparent from the following detailed description in conjunction with the accompanying drawings. It will be easily appreciated to those skilled in the art that various modifications, additions and substitutions are possible from the embodiments of the disclosure that are illustrated and described in detail in the following description, and the scope of the disclosure should not be limited to the following embodiments. The embodiments of the present disclosure are provided such that those skilled in the art completely understand the disclosure. It should be understood that the disclosure can include all modifications and/or equivalents and/or substations included in the idea and technical scope of the present disclosure. In the drawings, the same or similar elements are denoted by the same reference numerals even though they are depicted in different drawings.

In addition, it should be understood that the process and the operations of the present disclosure, described above, can be performed via computer programming instructions. These computer programming instructions can be installed to processors of data processing equipment that can be programmed, special computers, or universal computers. The instructions, performed via the processors of data processing equipment or the computers, can generate means that perform functions described in blocks of the flow chart. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flow chart therein. In addition, since the computer programming instructions can also be installed to computers or data processing equipment that can be programmed, they can create processes that perform a series of operations therein, described in the blocks of the flow chart therein.

The blocks of the flow chart refer to part of codes, segments or modules that include one or more executable instructions to perform one or more logic functions. It should be noted that the functions described in the blocks of the flow chart can be performed in a different order from the embodiments described above. For example, the functions described in two adjacent blocks can be performed at the same time or in reverse order.

In the embodiments, the terminology, component '~unit,' refers to a software element or a hardware element such as a PGGA, an ASIC, and the like, and performs a corresponding function. It should be, however, understood that the component '~unit' is not limited to a software or hardware element. The component '~unit' can be implemented in storage media that can be designated by addresses. The component '~unit' can also be configured to regenerate one or more processors. For example, the component '~unit' can include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' can be formed by combining the small number of elements and components '~units' or can be divided into additional elements and components '~units.' In addition, elements and components '~units' can also be implemented to regenerate one or more CPUs in devices or security multi-cards.

In general, video traffic is transmitted or received at a variable bit rate (VBR).

Figure 1B:
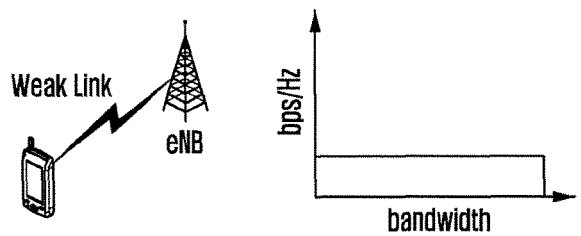
Figure 1C:
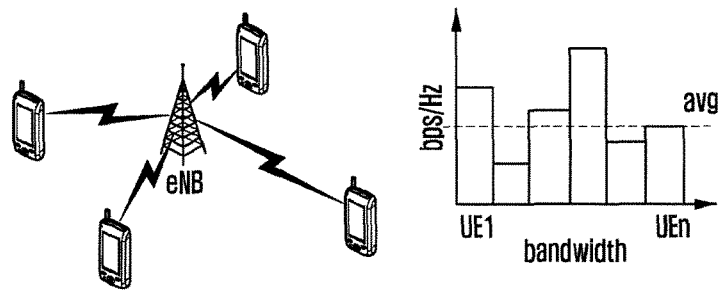

A wireless communication system operating at a variable bit rate (VBR) is shown in FIGS. 1A to 1C.

UE receives a signal with a received signal strength greater than a value from an eNodeB as shown in FIG. 1A. This means that the evolved NodeB (eNodeB) or a base station (BS) provides data to the UE at a higher data rate.

Meanwhile, the UE receives a signal with a received signal strength less than or equal to a value from an eNodeB as shown in FIG. B. This means that the eNodeB provides data to the UE at a low data rate.

As shown in FIG. 1C, the eNodeB provides data to the UE close thereto or the UE with a high level of signal quality at a high transmission data rate and to the UE farther therefrom or the UE with a low level of signal quality at a low transmission data rate.

In order to control VBR traffic, the MBR is generally set to more than GBR. When a network is not in a congestion state, the bearer performs reception at a bandwidth more than GBR. In contrast, when a network is in or close to a congestion state, the bearer may not use an extra bandwidth. When a transmission rate of video flow is lowered in a state where GBR is set to a value greater than the minimum data transmission rate, the reserved bandwidth may be wasted.

Currently used GBR bearers have disadvantages in that the efficiency of Radio Access Network (RAN) is rapidly decreased as the received signal strength of UE decreases. Since GBR bearers need to be reserved with a fixed bandwidth for the UE, when the received signal strength for the UE is decreased, a scheduling algorithm is needed to allocate more resource blocks to GBR traffic.

When the UE does not receive GBR traffic because of a weak signal or the mobility, wasted GBR may not be provided to video flow and this can affect a user's QoE.

In current or future wireless communication systems, a handover can frequently be made because of small cells. Such a frequent handover can affect the guarantee of a bandwidth for video flow. In 5G wireless communication systems using millimeter Wave, the signal strength can rapidly change because of the shadowing and the mobility.

In 5G wireless communication systems, a large amount of video flow is predicted. For example, users can use online video services, such as HD streaming videos or online games, and the like. In that case, when the user's UE receives signals with weak received signal strength from an eNodeB, the whole capacity of a cell can be decreased.

Embodiments of the present disclosure provide solutions to the aforementioned problems.

The QoE of a video can be defined by one or more of the following parameters: Initial Buffering Time, Frequency of Re-buffering, and Re-buffering duration. The parameters can affect the decrease of QoE of a video.

In order to improve a video QoE, the parameters need to be advanced. For example, the parameters are dynamically adjusted or a new parameter needs to be employed to define a property of a bearer.

In a mobile video, the Frequency of Re-buffering can appear because of the channel quality change and the mobility. In order to prevent this, a bandwidth can be reserved; however, it cannot effectively resolve the problems. The more the bandwidth is reserved the more the bandwidth is wasted. When the signal quality is deteriorated, the cell capacity can be decreased.

The present disclosure proposed a dynamic GBR mechanism of dynamically adjusting GBR considering the size of video buffer and the channel quality of the UE.

The embodiments of the present disclosure can be applied to the following states.

As a first scenario, it is assumed that a user is viewing an online HD video of one hour while traveling by bus or train. When the user equipment (UE) is passing through, or by, a number of eNodeBs and the network is continuously monitoring the signal quality and the buffer state for the video, the GBR can be adjusted as follows.

When UE is approaching an eNodeB (or the signal quality is high), the GBR increases. Therefore, the UE receives a larger amount of data from the eNodeB. The UE also increases the buffer size.

In contrast, when UE is approaching a cell boundary (or the signal quality is low) or undergoes a handover, GBR decreases and obtains the larger GBR later.

In that case, the reserved bandwidth for the video flow can be adjusted without interruption and the user may view the HD video without re-buffering.

As a second scenario, it is assumed that two users are viewing the same HD streaming video and the network is close to a congestion state.

In a state the panel qualities for the two users are deteriorated, when the first UE's buffer state is an under run state and the second UE secures a sufficient size of buffer for playback, the second UE's GBR is adjusted to be low and the first UE's GBR is adjusted to be high. In that case, the first UE can continuously play the HD video.

When the first UE has a high signal quality and the second UE has a low signal quality, the GBR of the first UE increases for a certain period of time and then decreases. In that case, the second the UE sets the current GBR to a small value so that the UE can use a bandwidth after the signal quality is improved.

Therefore, the video QoE for the two users is increased and the cell capacity is also increased.

For the dynamic GBR mechanism according to an embodiment of the present disclosure, the GBR of a bearer is not fixed. That is, GBR of a bearer is variable.

A bearer according to an embodiment of the present disclosure can be defined by one or more of the following parameters: average GBR, maximum GBR and allowance time. The average GBR parameter refers to the average GBR available to a corresponding bearer. The average GBR can be determined by type of flow, policy, user subscription, and so forth. The maximum GBR parameter refers to the maximum GBR that can be obtained based on a request. The maximum GBR can be determined based on the whole capacity of an eNodeB (or a cell). The allowance time parameter refers to a maximum allowance time for a high GBR when the maximum GBR is requested.

In any case, the UE may not obtain resources more than an additional amount of resources, over the average GBR. PCRF authorizes a bearer with the property of the bearer.

The allowance amount of additional resources, obtained by a dynamic GBR mechanism according to an embodiment of the present disclosure, can be expressed by the following Equation 1.

An allowance amount of additional resources=(Max. GBR−Avg. GBR)*allowance time      Equation 1.

An eNodeB allows UE to use the additional resources within a limit of additional resources. In that case, eNodeB continuously monitors the GBR that can be supported to the UE. When the additional resource for the UE is exhausted, the eNodeB re-sets the GBR for the UE to the average GBR.

The eNodeB can adjust GBR by the scheduling mechanism, based on the video buffer size and the signal strength (current signal strength) for the UE. The change in GBR allows a scheduler of the eNodeB to adjust wireless resources for video flow, thereby enhancing the efficiency of RAN.

Figure 2:
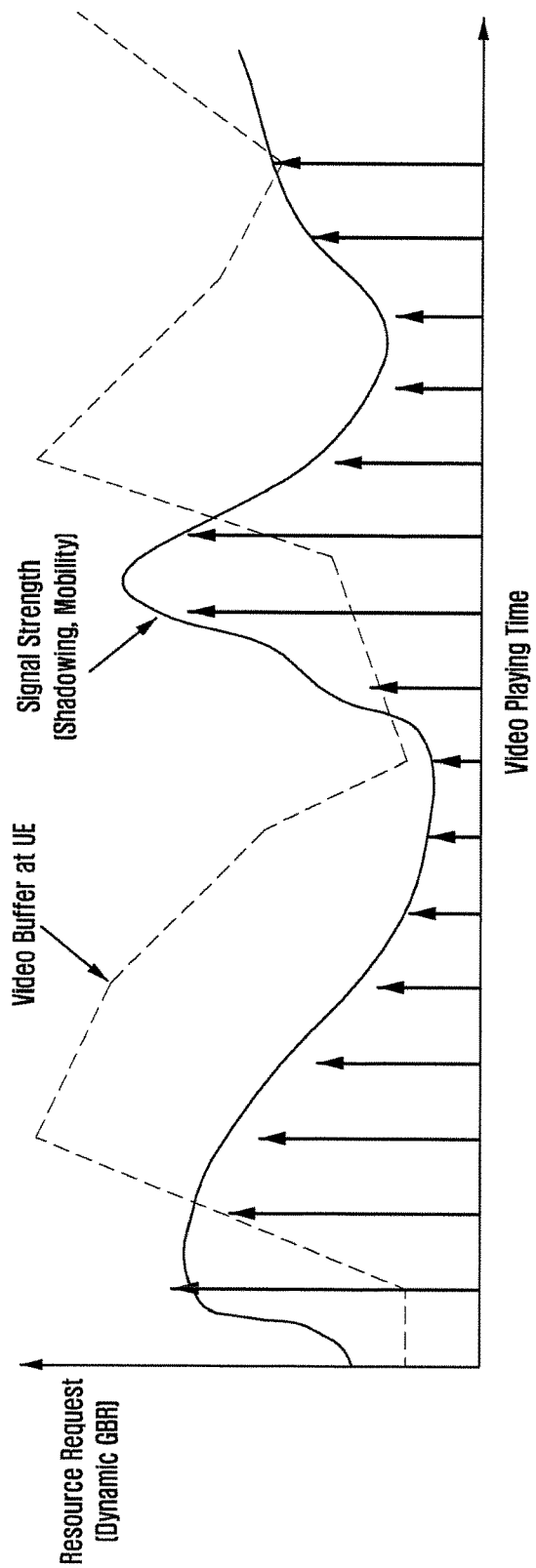
FIG. 2 is a graph of resource request vs. video playing time, from a scheduler according to a dynamic GBR bearer.

A graph of resource request vs. video playing time, from a scheduler according to a dynamic GBR bearer is shown in FIG. 2.

As shown in FIG. 2, when the video buffer size for the UE is relatively large or signal strength for UE is greater than or equal to a preset value, GBR set for a bearer is increased to set a high data transmission rate.

In contrast, when the video buffer size for UE is relatively small or signal strength for the UE is less than a preset value, the GBR set for a bearer is decreased to set a low data transmission rate.

In a dynamic GBR mechanism according to an embodiment of the present disclosure, when the UE is affected under strong signal strength from an eNodeB, GBR is adjusted to be large so that a relatively large amount of data can be downloaded to the buffer of the UE. When UE is affected under weak signal strength from an eNodeB or undergoes a handover, GBR is adjusted to be small.

Since a bandwidth reserved for video flow is decreased while the signal strength is relatively small, the capacity of RAN is not decreased.

Figure 3:
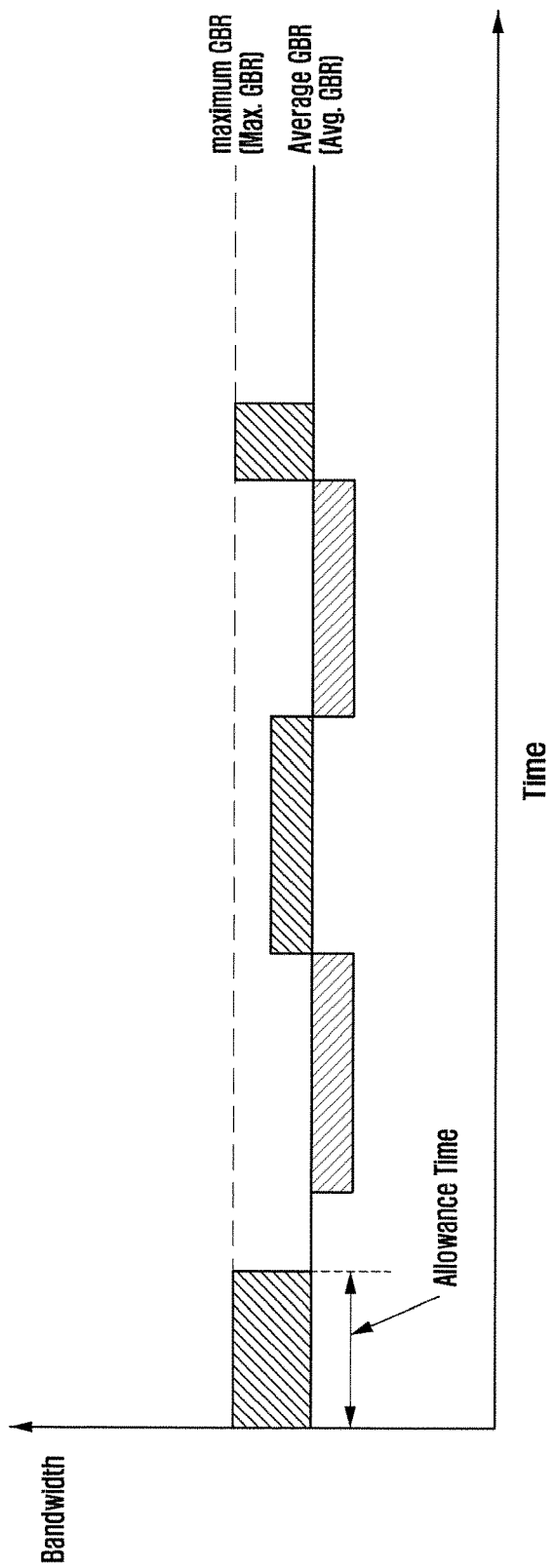
FIG. 3 is a graph of the bandwidth that describes a method of dynamically adjusting GBR according to an embodiment of the present disclosure.

FIG. 3 is a graph of the bandwidth that describes a method of dynamically adjusting GBR according to an embodiment of the present disclosure.

In order to dynamically adjust GBR, an eNodeB continuously monitors an extra resource consumed by a dynamic GBR bearer. The extra resource that the UE can obtain over the average GBR is expressed by the following Equation 1.

A resource allocated to one or more UE in a cell can be continuously monitored and expressed by the following Equation 2.

$$\text{Resource}_{Curr} = \frac{\sum (GBR_i - GBR_{Avg})T_i}{\sum T_i} \qquad \text{Equation 2}$$

Where GBRi denotes an allowance amount of additional resource determined by Equation 1. GBRi indicates the respective, hatched areas shown in FIG. 3.

A time interval that the increased GBR (e.g., the maximum GBR) can be applied to is expressed by the following Equation 3.

$$T = \frac{\text{Allowance Limit} - \text{Resource}_{Curr}}{GBR_{Req} - GBR_{Avg}} \qquad \text{Equation 3}$$

Where $GBR_{req}$ is GBR requested by UE or eNodeB. $GBR_{req}$ is less than the maximum GBR. When $GBR_{req}$ is less than the maximum GBR, the time interval T is increased.

Figure 4:
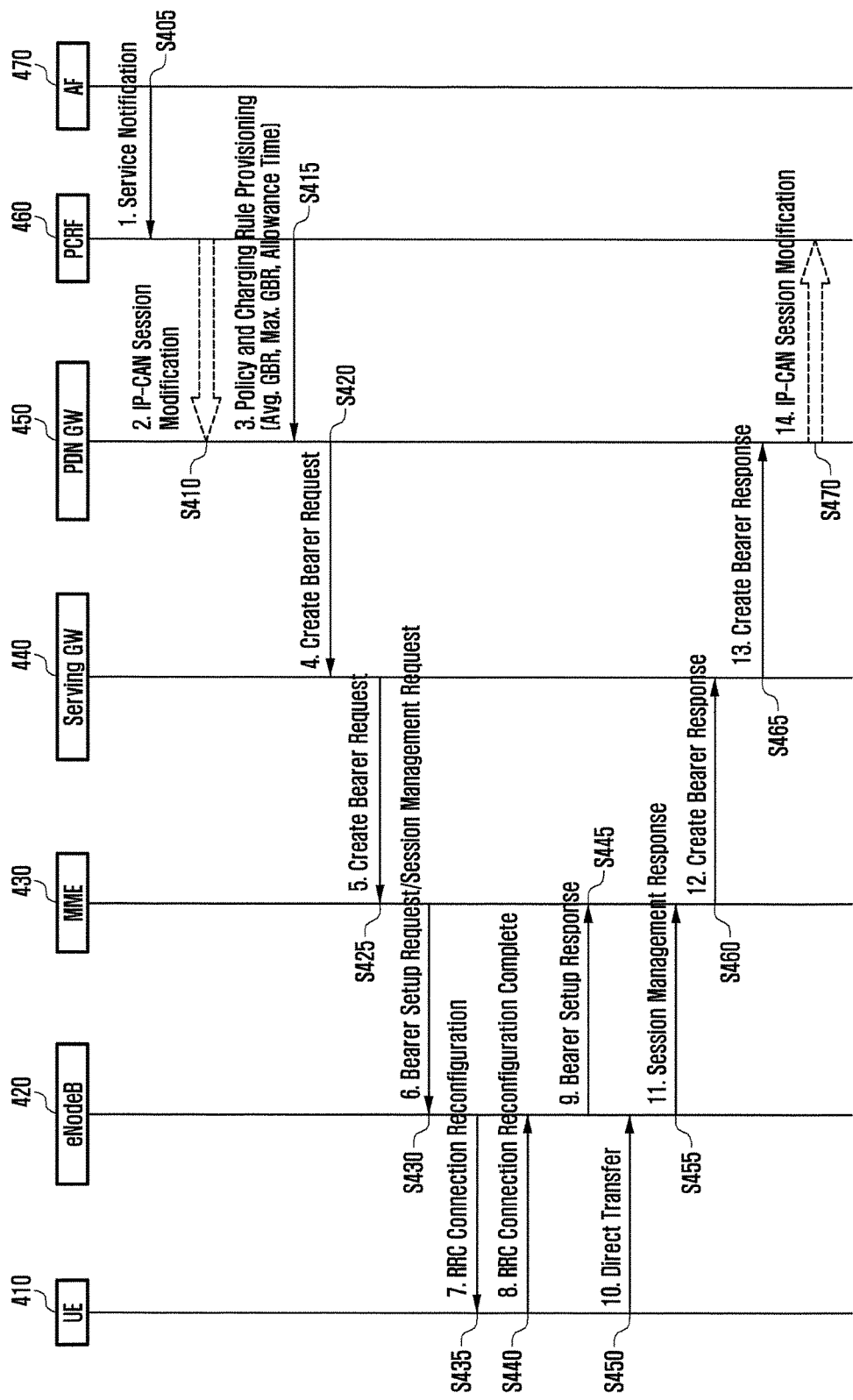
FIG. 4 is a signal flow chart that describes a method of setting a dynamic GBR bearer according to an embodiment of the present disclosure.

FIG. 4 is a signal flow chart that describes a method of setting a dynamic GBR bearer according to an embodiment of the present disclosure.

The GBR bearer is related to parameters, such as GBR, MBR, and ARP. A dynamic GBR parameter according to an embodiment of the present disclosure includes an average GBR, the maximum GBR, an allowance time, and ARP.

A dynamic GBR bearer can be set for video flow. The information about video flow can be obtained from Application Function (AF) or Traffic Detection function (TDF). When video flow is detected, a dynamic GBR bearer can be set through a normal dedicated bearer setup procedure. In that case, the PCRF detects user subscription and authorizes QoS parameter for a bearer. When the PCRF detects video flow, the PCRF performs a bearer setup procedure to dynamically adjust GBR. When the PCRF authorizes the QoS parameter for a bearer, a dynamic GBR bearer may be set.

Referring to FIG. 4, the method of setting a dynamic GBR bearer is described in detail as follows.

Application Function (AF) 470 transmits a message, Service Notification, to PCRF 460 (S405). PCRF 460 transmits a message, IP-CAN Session Modification, to PDN GW 450 (S410). When PCRF 460 has detected video flow, PCRF 460 transmits information such as the average GBR, the maximum GBR, the allowance time, and so forth, to PDN GW 450 in order to provision Policy and Charging Rules (S415).

PDN GW 450 transmits a message of requesting creation of a bearer, Create Bearer Request, to serving GW 440 (S420). The serving GW 440 transmits the Create Bearer Request to MME 430 (S425).

The MME 430 transmits a message, Bearer Setup Request or Session Management Request, to an eNodeB 420 (S430). The eNodeB 420 transmits a message, RRC Connection Reconfiguration, to UE 410 (S435). The UE 410 transmits a message, RRC Connection Reconfiguration Complete, to the eNodeB 420 (S440). The eNodeB 420 transmits a message, Bearer Setup Response, to the MME 430 (S445).

Thereafter, the UE 401 transmits a message, Direct Transfer, to the eNodeB 420 (S450). The eNodeB 420 transmits the Session Management Response message to the MME 430 (S455). The MME 430 transmits the Create Bearer Response message to the serving GW 440 (S460). The serving GW 440 transmits the Create Bearer Response message to the PDN GW 450 (S465).

The PDN GW 450 transmits the IP-CAN Session Modification message to the PCRF 460 (S470), thereby completing the procedure of setting up the dynamic GBR bearer.

In the following description, a method for adjusting a dynamic GBR according to the present disclosure is described.

In a first embodiment, a dynamic GBR mechanism is implemented in such a way that it is controlled by an eNodeB.

In a dynamic GBR mechanism under the control of an eNodeB, the UE reports the signal quality (such as, the received signal strength from the eNodeB) and the buffer information to the eNodeB. The eNodeB determines a GBR to be set for a corresponding bearer, based on the signal quality and the buffer information from the UE.

A bearer value is adjusted before the eNodeB performs a scheduling process. The scheduling process uses an adjusted GBR for a corresponding bearer.

In that case, the GBR can be increased within a limit of additional resources as the signal quality of UE is greater than or equal to a preset value or the buffer is close to an under run state. The GBR can be decreased as the signal quality of UE is less than a preset value or the buffer space is sufficient.

The eNodeB holds an extra resource allocated to a corresponding bearer over the average GBR. When the additional resources are not allowed any more, the adjusted GBR is re-set to the average GBR.

Figure 5:
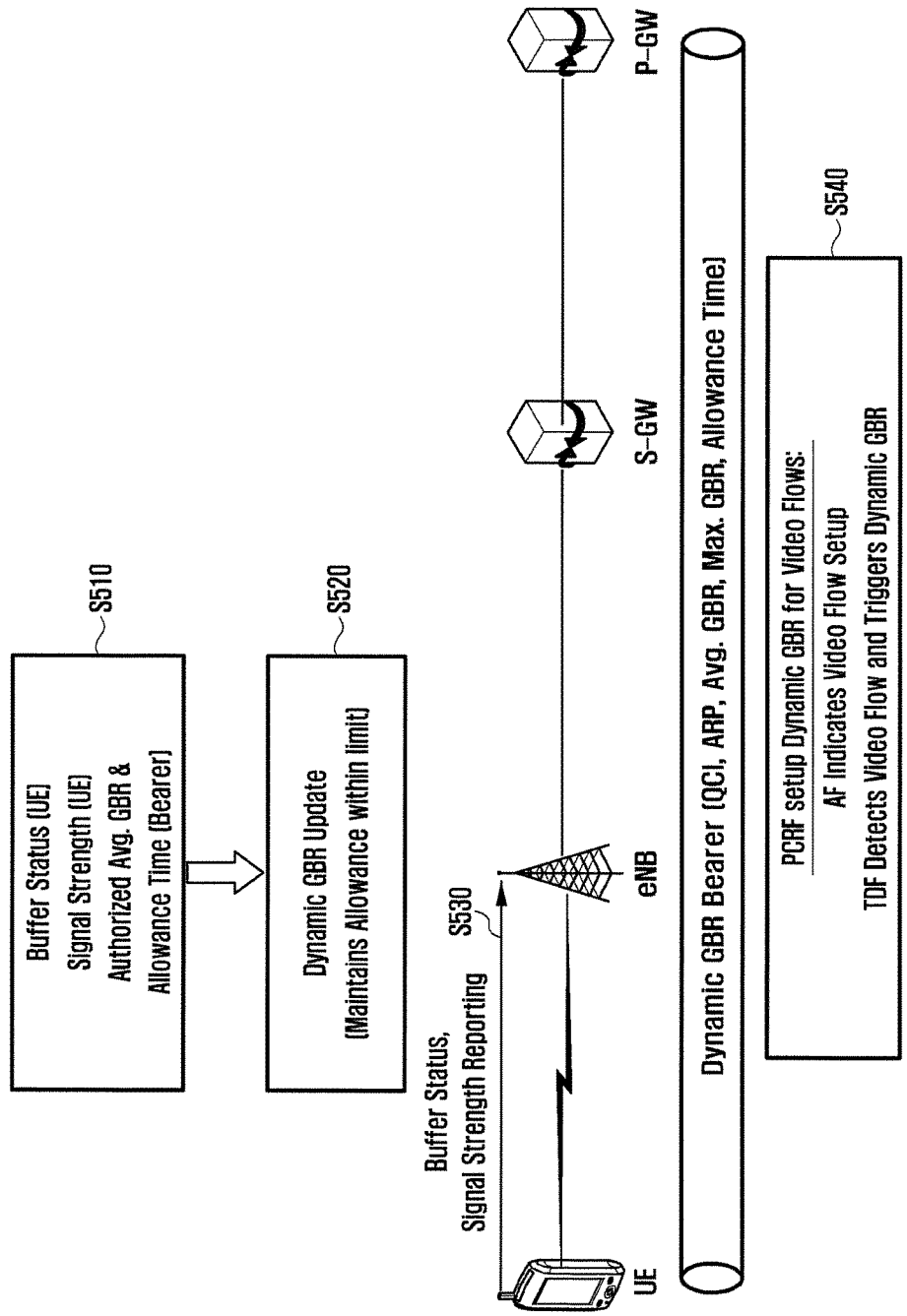
FIG. 5 is a diagram that describes a concept of a first embodiment of the present disclosure.

The concept of the first embodiment is shown in FIG. 5.

When a dynamic GBR bearer is set, the eNodeB dynamically adjusts the GBR within a limit of additional resources. The eNodeB controls the entire operation of the dynamic GBR bearer. The UE reports the received signal strength and the buffer status information to the eNodeB. The eNodeB detects a GBR adjustable within a limit of resources and applies it to a corresponding bearer.

When a preset period of time has elapsed since a modified GBR was applied, the modified GBR can be re-set to the average GBR (as a previous/original value).

As shown in FIG. 5, PCRF sets a dynamic GBR for video flow (S540). In that case, AF indicates a setting for video flow, and TDF detects video flow and triggers the dynamic GBR.

The UE reports the buffer status and the received signal strength to an eNodeB in operation S510 or S530. The eNodeB updates the GBR of a corresponding bearer within a limit allowed by UE (S520).

Figure 6:
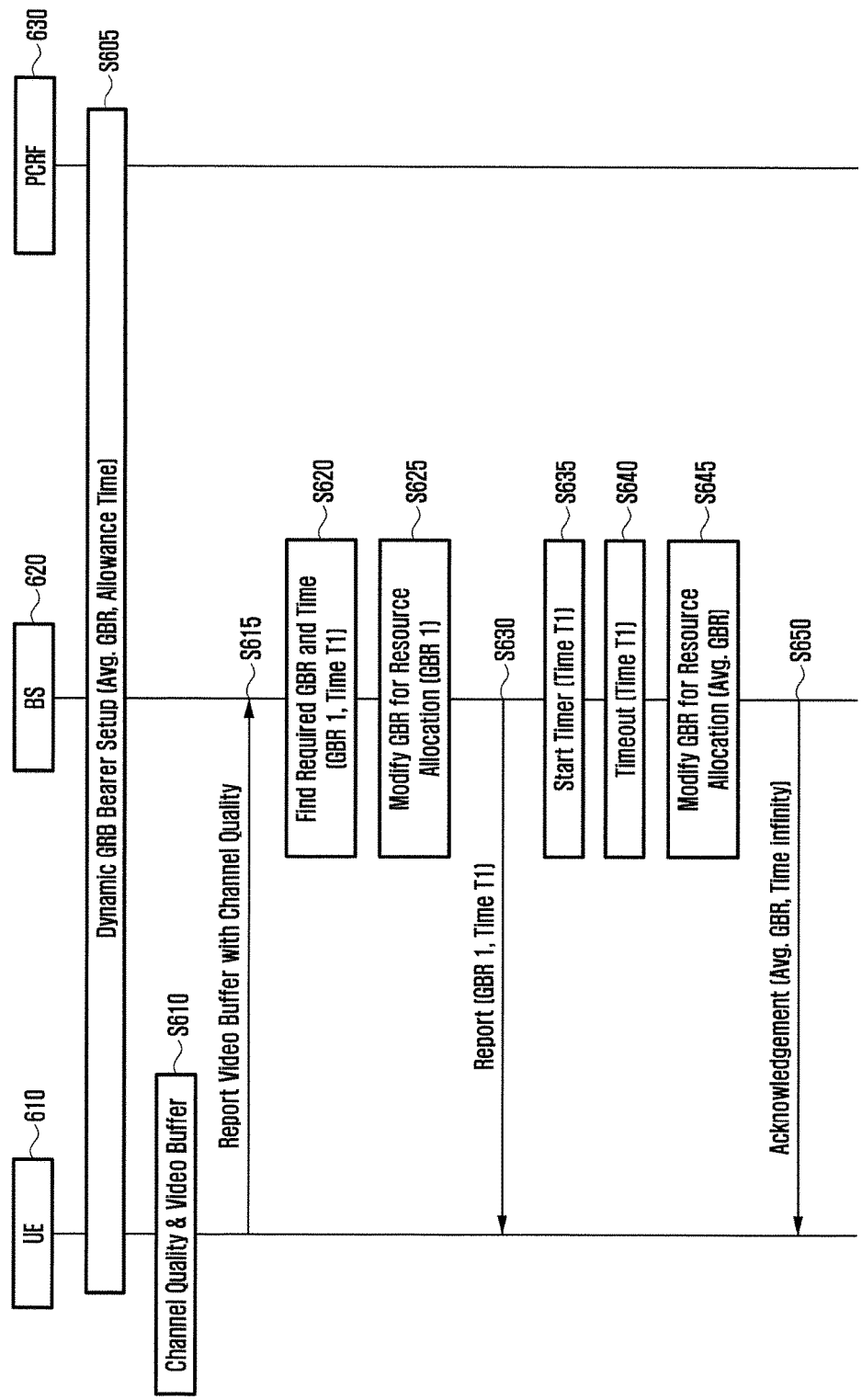
FIG. 6 is a signal flow chart that describes a method of dynamically adjusting a GBR according to a first embodiment of the present disclosure.

FIG. 6 is a signal flow chart that describes a method of dynamically adjusting a GBR according to a first embodiment of the present disclosure.

The UE 610, a base station (BS) 620, and PCRF 630 set a dynamic GBR bearer through the procedure of FIG. 4 in operation 605. The dynamic GBR bearer means a bearer with a property that can dynamically adjust GBR. In that case, the property of the dynamic GBR bearer is determined by parameters, such as the average GBR, the maximum GBR, and the allowance time.

The UE 610 collects the channel quality and the buffer status (video buffer information) (S610). The UE 610 reports the collected information to the BS 620 (S615).

When the BS 620 ascertains that the GBR of a bearer for the UE 610 needs to be adjusted, the BS 620 determines a requested (possible) GBR, GBR 1, and an allowance time, T1 (S620). The BS 620 modifies the GBR for resource allocation (S625). That is, the BS 620 modifies an existing GBR to GBR 1.

The BS 620 transmits the adjusted GBR (GRB 1) and the time (T1) applied to the adjusted GBR to the UE 610 (S630).

The BS 620 starts the timer (S635). The timer monitors whether the time T1 has elapsed. When the BS 620 detects that the timer has counted up or down for a preset period of time (S640), BS 620 modifies GBR for resource allocation (S645). In that case, the BS 620 modifies the GBR to the average GBR that is a value before the adjustment.

The BS 620 transmits the average GBR to the UE 610 (S650). In that case, the BS 620 sets the time information to infinity.

As a second embodiment, a dynamic GBR mechanism is implemented in such a way that it is controlled by UE.

In a dynamic GBR mechanism under the control of UE, the UE determines a GBR, based on the measured, received signal quality and the buffer status. The UE reports information about the determined GBR to the BS, so that the modified GBR can be applied before the BS performs a scheduling.

The BS continues to monitor extra resource over the average GBR each time that the GBR is modified. When the extra resource exceeds a limit, the GBR can be re-set to the average GBR.

Figure 7:
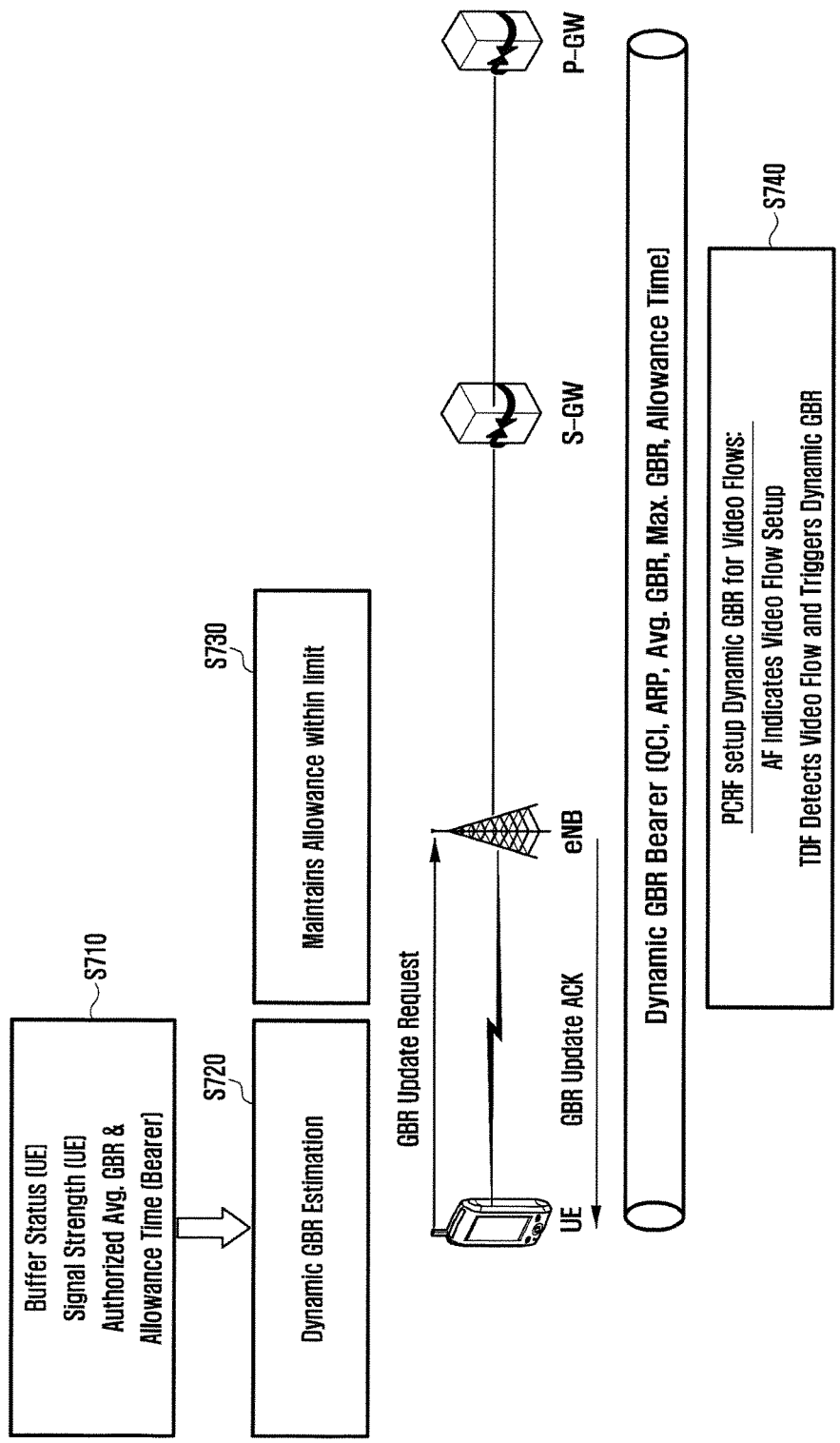
FIG. 7 is a diagram that describes a concept of a second embodiment of the present disclosure.

The concept of the second embodiment is shown in FIG. 7.

The UE detects the buffer status and the received signal strength (S710). The UE also detects the authorized, average GBR and the allowance time.

The UE measures or estimates a dynamic GBR (S720). For example, when the UE ascertains that the received, signal strength is over a preset value, the UE determines to increase the GBR for a bearer that has been set.

In that case, when the UE transmits a GBR update request message to the BS, the BS allowed for the update. During the process, the BS adjusts the GBR and the allowance time within a limit of resources (S730).

Since operation S740 of FIG. 7 is the same as operation S540 of FIG. 5 that has been already explained, its detailed description is omitted herein.

Figure 8:
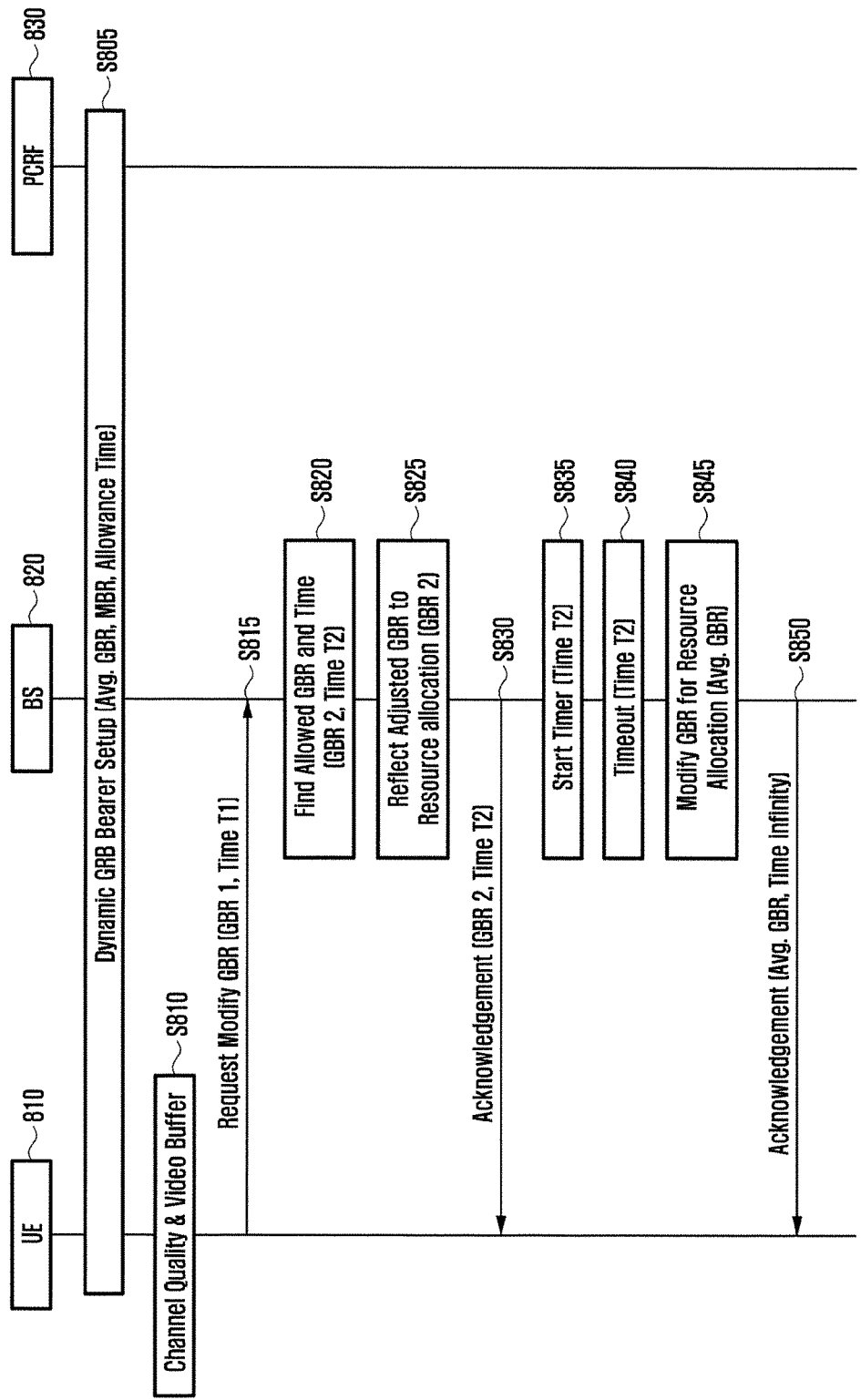
FIG. 8 is a signal flow chart that describes a method of dynamically adjusting a GBR according to a second embodiment of the present disclosure.

FIG. 8 is a signal flow chart that describes a method of dynamically adjusting a GBR according to a second embodiment of the present disclosure.

UE 810, a base station (BS) 820, and PCRF 830 set a dynamic GBR bearer through the procedure of FIG. 4 in operation S805. The property of the dynamic GBR bearer is determined by parameters, such as the average GBR, the maximum GBR, and the allowance time.

UE 810 collects the channel quality and the buffer status (video buffer information) (S810). UE 810 determines whether to adjust the GBR for a bearer that receives video flow, based on the collected channel quality and buffer status. For example, when the received, signal strength from the BS is greater than or equal to a preset value, the GBR can be set to a relatively large value. During the process, UE 810 determines a GBR to be adjusted (GBR 1) and an allowance time (T1) to which the adjusted GBR is applied.

UE 810 transmits a GBR modification request message, including the GBR to be adjusted (GBR 1) and the allowance time (T1) that the GBR 1 is applied to, to the BS 820 (S815).

The BS 820 determines whether to modify the GBR, based on the received GRB 1 and the allowance time T1.

When the BS 820 determines to modify the GBR, the BS 820 sets an adjusted GBR (GBR 2) and an adjusted, allowance time (T2) that UE 810 can accept (S820). After that, the BS 820 reflects the adjusted GBR (GBR 2) to resource allocation (S825).

The BS 820 transmits the adjusted GBR (GRB 2) and the adjusted, allowance time (T2) to the UE 810 (S830).

The BS 820 starts the timer (S835). The timer monitors whether the time T2 has elapsed. When the BS 820 detects that the timer has counted up or down for the time T2 (S840), the BS 820 modifies GBR for resource allocation (S845). In that case, the BS 820 modifies the GBR to the average GBR that is a value before the modification.

The BS 820 transmits the average GBR to the UE 810 (S850). In that case, the BS 820 sets the time information to infinity.

As a third embodiment, a dynamic GBR mechanism is implemented in such a way that it is controlled by the interaction between UE and PCRF.

In the dynamic GBR mechanism, GBR can be dynamically modified without modifying the property of a bearer. When a GBR bearer is established, the PCRF transmits the average GBR, the maximum GBR and the allowance time to UE. The UE triggers the PCRF to perform the bearer modification procedure. In that case, the PCRF maintaining the average GBR within the allowance time before the modification of GBR is allowed.

Each time that UE requests to modify GBR through a request, the request includes a GBR modification requested time, or the allowance time that the modified GBR will be applied. When the allowance time has elapsed, the PCRF can reset the GBR to the average GBR.

The third embodiment does not need a serious modification in a bearer setup mechanism.

Figure 9:
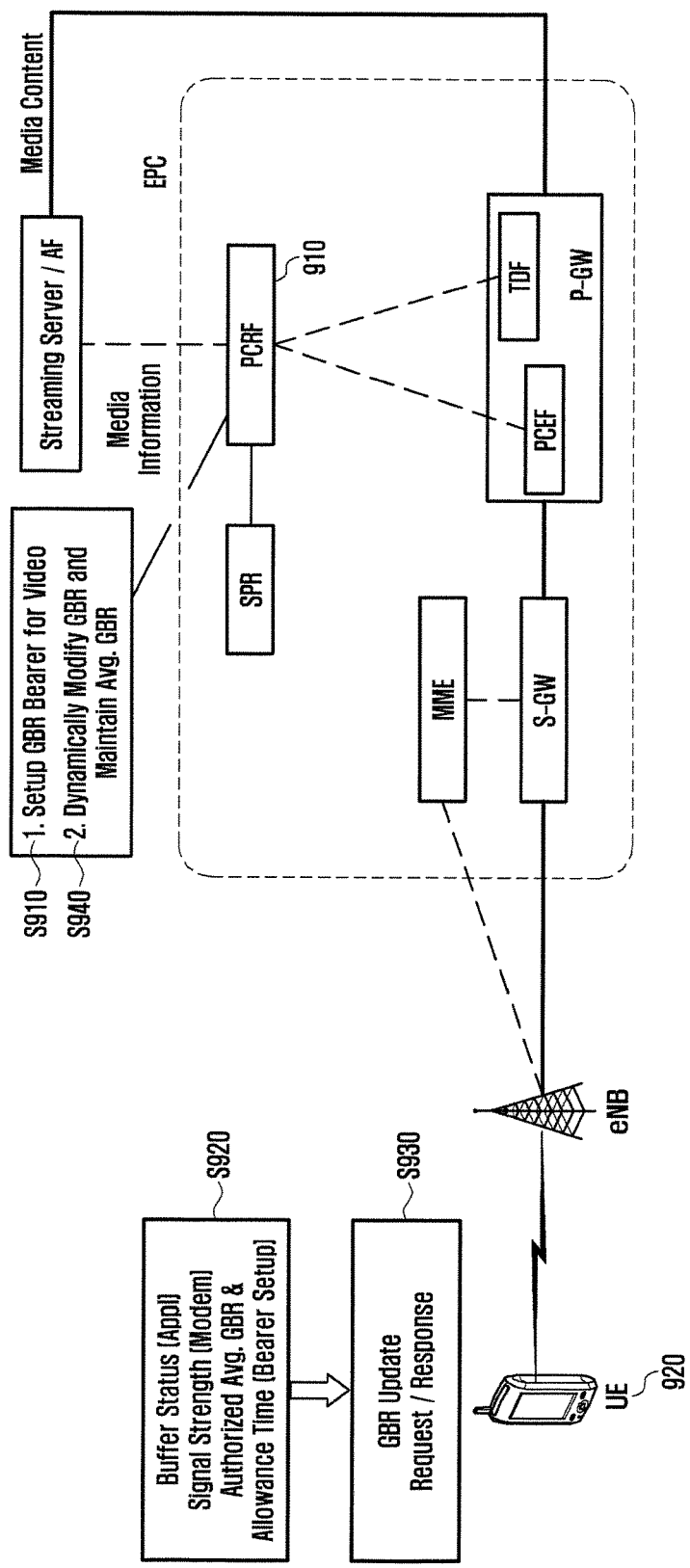
FIG. 9 is a diagram that describes a concept of a third embodiment of the present disclosure.

The concept of the third embodiment is shown in FIG. 9.

As shown in FIG. 9, the PCRF 910 sets a GBR bearer for videos (S910). The UE 920 obtains the buffer status and the signal strength (S920). The UE 920 also obtains the authorized, average GBR and the allowance time.

UE 920 transmits a GBR update request message to the PCRF 910, if necessary (S930).

The PCRF 910 dynamically adjusts GBR of a bearer for the UE 910, and re-sets the GBR to the average GBR after a preset period of time has elapsed (S940).

Figure 10:
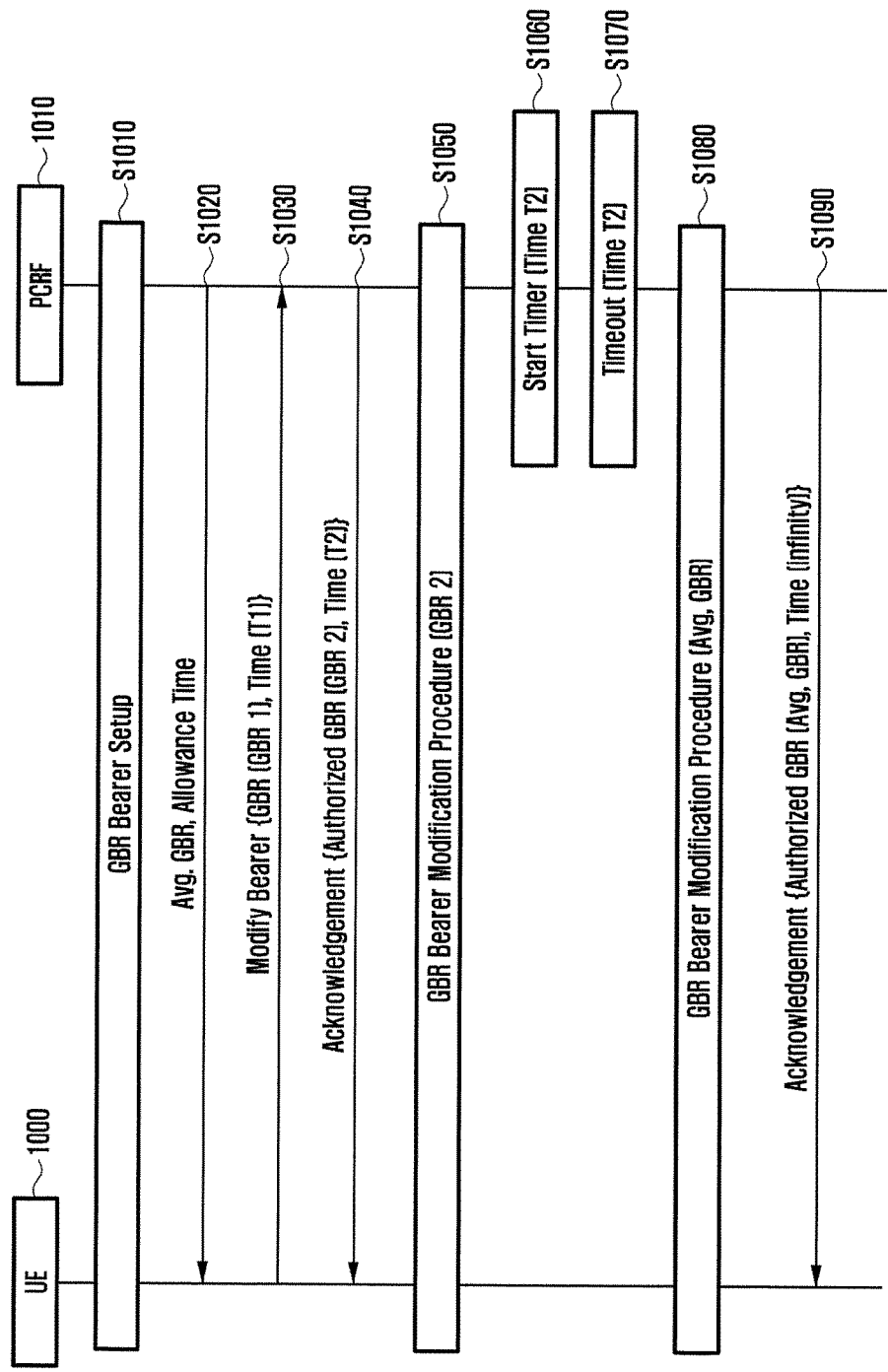
FIG. 10 is a signal flow chart that describes a method of dynamically adjusting a GBR according to a third embodiment of the present disclosure.

FIG. 10 is a signal flow chart that describes a method of dynamically adjusting a GBR according to a third embodiment of the present disclosure.

UE 1000 and PCRF 1010 set a GBR bearer in operation S1010.

PCRF 1010 transmits the average GBR and the allowance time for the set GBR bearer to UE 1000 (S1020).

UE 1000 measures the signal quality or the buffer status. When UE 1000 concludes that the GBR for the bearer needs to be adjusted, UE 1000 transmits a bearer GBR modification request message to the PCRF 1010 (S1030). The bearer GBR modification request message includes a GBR to be modified (GBR 1) and an allowance time (T1) to which the modified GBR is applied.

In that case, PCRF 1010 determines whether to modify the GBR, based on the received GRB 1 and the allowance time T1.

When PCRF 1010 determines to modify the GBR, PCRF 1010 transmits an adjusted GBR (GBR 2) to be authorized for UE 1000 and an adjusted, allowance time (T2) to which the adjusted GBR (GBR 2) will be applied to UE 1000 (S1040).

UE 1000 and PCRF 1010 perform a GBR bearer modification procedure (S1050).

PCRF 1010 starts the timer (S1060). The timer monitors whether the time T2 has elapsed. When PCRF 1010 detects that the timer has counted up or down for the time (S1070), PCRF 1010 performs a GBR bearer modification procedure (S1080). In that case, PCRF 1010 modifies the GBR to the average GBR as a value before the modification.

PCRF 1010 transmits the authorized GBR (the average GBR) and the time information to the UE 1000 (S1090). In that case, PCRF 1010 sets the time information to infinity.

Figure 11:
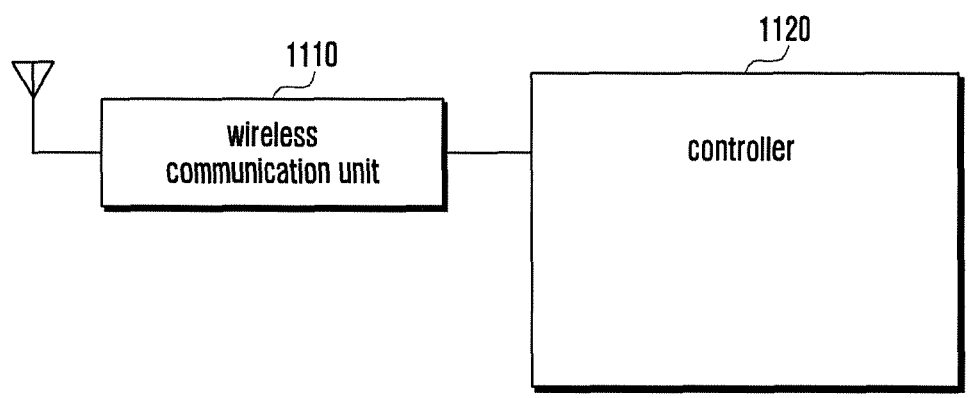
FIG. 11 is a schematic block diagram of UE according to an embodiment of the present disclosure.

FIG. 11 is a schematic block diagram of UE according to an embodiment of the present disclosure. The UE includes a wireless communication unit 1110 and a controller 1120.

The wireless communication unit 1110 (or a transceiver) transmits signals to and receives signals from an eNodeB through a wireless channel. The signals include control information, such as scheduling information, channel status, and buffer status of the UE. The signals also include data (or traffic).

The controller 1120 controls signal flow between the components of the UE (not shown).

In an embodiment, the controller 1120 sets a dynamic bearer that can dynamically adjust a bit rate. The controller 1120 transmits a report message, including the channel status and/or the video buffer status, to the eNodeB. In response to the report message, the controller 1120 receives a modified bit rate to be applied to the dynamic bearer and time information to which the modified bit rate is applied from the eNodeB. The controller 1120 performs a control operation to receive traffic through the bearer according to the modified bit rate for the time period corresponding to the time information.

In that case, the property of the dynamic bearer is determined by one or more of the following parameters: the maximum bit rate, the average bit rate, and the allowance time to which the maximum bit rate is applied.

In another embodiment, the controller 1120 sets a dynamic bearer that can dynamically adjust a bit rate. The controller 1120 detects the channel status and/or the video buffer status of the UE, and determines the modified bit rate to be applied to the dynamic bearer and the time information to which the modified bit rate is applied, based on the detected statuses. The controller 1120 transmits a bit rate modification request message, including the determined, modified bit rate and the determined, time information, to the eNodeB.

In response to the bit rate modification request message, the controller 1120 receives the acknowledgement message from the eNodeB, and performs a control operation to receive traffic through the dynamic bearer according to the bit rate and the time information included in the acknowledgement message.

When the time period corresponding to the time information included in the acknowledgement message has elapsed, the controller 1120 performs a control operation to receive a bit rate to be applied to the dynamic bearer from the eNodeB.

Figure 12:
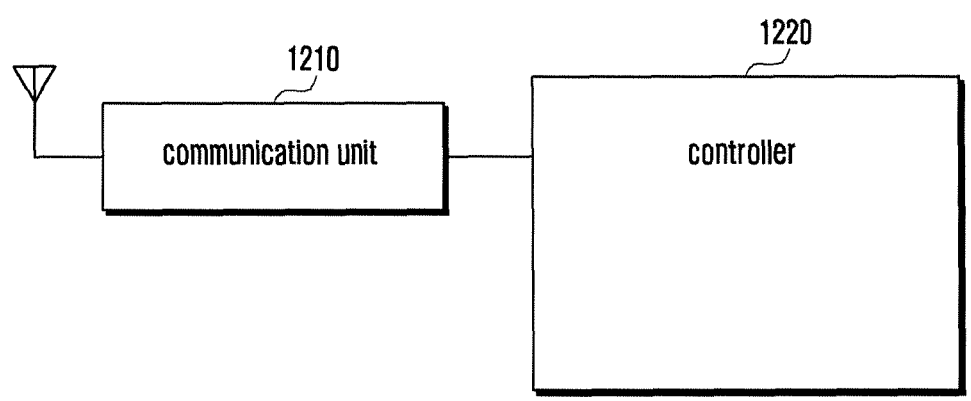
FIG. 12 is a schematic block diagram of an eNodeB according to an embodiment of the present disclosure.

FIG. 12 is a schematic block diagram of an eNodeB according to an embodiment of the present disclosure. The eNodeB includes a communication unit 1210 and a controller 1220.

The communication unit 1210 (or a transceiver) transmits signals to and receives signals from the UE through a wireless channel. The signals include control information, such as scheduling information, channel status, and buffer status of UE. The signals also include data (or traffic).

The communication unit 1210 transmits signals to and receives signals from core network nodes through a wired interface. Examples of the core network nodes are the PCRF, Mobility Management Entity (MME), serving gateway, and so forth.

The controller 1220 controls signal flow between the components of the eNodeB (not shown).

In an embodiment, the controller 1220 sets a dynamic bearer that can dynamically adjust a bit rate for the UE. The controller 1220 receives a report message, including the channel status and/or the video buffer status of UE, from the UE. The controller 1220 determines a modified bit rate to be applied to the dynamic bearer and time information to which the modified bit rate is applied, and transmits the determined, modified bit rate and the determined time information to the UE.

In that case, the property of the dynamic bearer is determined by one or more of the following parameters: the maximum bit rate, the average bit rate, and the allowance time to which the maximum bit rate is applied.

In another embodiment, the controller 1220 sets a dynamic bearer that can dynamically adjust a bit rate for the UE. The controller 1220 receives a bit rate modification request message, including the channel status and/or the video buffer status of the UE, from the UE, and determines whether to accept the modified bit rate and the time information. The controller 1220 transmits the acknowledgement message, including the bit rate and the time information according to the determination result to the UE.

In that case, the controller 1220 detects an amount of resources that will be additionally allowed for one or more of the UE, and determines the maximum bit rate to be set to the UE and the allowance time, according to the detected amount of resources. The controller 1220 determines whether to modify the bit rate for the UE, based on the determined, maximum bit rate and the allowance time.

As described above, the method and apparatus of the present disclosure can dynamically change a property of a bearer, thereby enhancing Quality of Experience (QoE) and the efficiency of the entire network.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a bearer by a user equipment (UE) in a wireless communication system comprising:
    setting a dynamic bearer where a bit rate is dynamically adjustable;
    transmitting, to an evolved node B (eNodeB), a report message, including a channel status and a video buffer status of the UE;
    receiving, from the eNodeB, a modified bit rate determined based on the channel status and the video buffer status to be applied to the dynamic bearer, and time information to which the modified bit rate is applied; and
    receiving traffic through the dynamic bearer according to the modified bit rate for a time period corresponding to the time information,
    wherein the modified bit rate is determined based on an amount of resources additionally allowed for the UE, the amount of resources is associated with a maximum bit rate and allowance time to which the maximum bit rate is applied, and the maximum bit rate is determined based on a capacity of the eNodeB, and
    wherein a bit rate of the dynamic bearer is set, after the time period corresponding to the time information, from the modified bit rate to an average bit rate, wherein the average bit rate indicates an average guaranteed bit rate (GBR) available to a corresponding bearer and the average bit rate is determined based on a type of flow, a policy, and an user subscription.

2. The method of claim 1, further comprising:
    receiving a bit rate to be applied to the dynamic bearer from the eNodeB when the time period corresponding the time information has elapsed,
    wherein transmission of the report message comprises:
    transmitting the report message to the eNodeB when the channel status of the UE is greater than or equal to a preset value.

3. A method for operating a bearer by an evolved Node B (eNodeB) in a wireless communication system comprising:
    setting a dynamic bearer for user equipment (UE) where a bit rate is dynamically adjustable;
    receiving a report message from the UE, the report message including a channel status and a video buffer status of the UE;
    determining a modified bit rate based on the channel status and the video buffer status to be applied to the dynamic bearer and time information to which the modified bit rate is applied; and
    transmitting the modified bit rate and the time information to the UE, wherein the modified bit rate is determined based on an amount of resources additionally allowed for the UE, the amount of resources is associated with a maximum bit rate and allowance time to which the maximum bit rate is applied, and the maximum bit rate is determined based on a capacity of the eNodeB, and wherein a bit rate of the dynamic bearer is set, after a time period corresponding to the time information, from the modified bit rate to an average bit rate, wherein the average bit rate indicates an average guaranteed bit rate (GBR) available to a corresponding bearer and the average bit rate is determined based on a type of flow, a policy, and an user subscription.

4. The method of claim 3, wherein:
the method further comprises:
   starting a timer for the time period corresponding to the time information; and
   transmitting a message for re-setting the bit rate of the dynamic bearer to the average bit rate to the UE when the time period of the timer has elapsed.

5. A method for operating a bearer by a user equipment (UE) in a wireless communication system comprising:
   setting a dynamic bearer where a bit rate is dynamically adjustable;
   detecting a channel status and a video buffer status of the UE;
   determining a modified bit rate based on the channel status and the video buffer status to be applied to the dynamic bearer and time information to which the modified bit rate is applied, based on the detection result; and
   transmitting a bit rate modification request message, including the determined modified bit rate and the time information, to an evolved Node B (eNodeB),
wherein the modified bit rate is determined based on an amount of resources additionally allowed for the UE, the amount of resources is associated with a maximum bit rate and allowance time to which the maximum bit rate is applied, and the maximum bit rate is determined based on a capacity of the eNodeB, and
wherein a bit rate of the dynamic bearer is set, after a time period corresponding to the time information, from the modified bit rate to an average bit rate, wherein the average bit rate indicates an average guaranteed bit rate (GBR) available to a corresponding bearer and the average bit rate is determined based on a type of flow, a policy, and an user subscription.

6. The method of claim 5, further comprising:
receiving an acknowledgement message in response to the bit rate modification request message from the eNodeB;
receiving traffic through the dynamic bearer according to a bit rate and time information included in the acknowledgement message; and
receiving a bit rate to be applied to the dynamic bearer from the eNodeB when the time period corresponding to the time information included in the acknowledgement message has elapsed.

7. A method for operating a bearer by an evolved Node B (eNodeB) in a wireless communication system comprising:
   setting a dynamic bearer for user equipment (UE) where a bit rate is dynamically adjustable;
   receiving a bit rate modification request message from the UE, the bit rate modification request message including a channel status and a video buffer status of the UE;
   determining a modified bit rate and time information based on the channel status and the video buffer status; and
   transmitting an acknowledgement message including the modified bit rate and the time information according to the determination result to the UE,
wherein the modified bit rate is determined based on an amount of resources additionally allowed for the UE, the amount of resources is associated with a maximum bit rate and allowance time to which the maximum bit rate is applied, and the maximum bit rate is determined based on a capacity of the eNodeB, and
wherein a bit rate of the dynamic bearer is set, after a time period corresponding to the time information, from the modified bit rate to an average bit rate, wherein the average bit rate indicates an average guaranteed bit rate (GBR) available to a corresponding bearer and the average bit rate is determined based on a type of flow, a policy, and an user subscription.

8. The method of claim 7, wherein:
the determining the modified bit rate and the time information further comprises:
   determining whether to accept a bit rate modification request of the UE based on the maximum bit rate and the allowance time; and
the method further comprises:
   starting a timer for the time period corresponding to the time information; and
   transmitting a message for re-setting the bit rate of the dynamic bearer to the average bit rate to the UE when the time period of the timer has elapsed.

9. A user equipment (UE) for dynamically operating a bearer in a wireless communication system comprising:
a transceiver; and
a controller coupled with the transceiver and configured to control to:
   set a dynamic bearer where a bit rate is dynamically adjustable;
   transmit, to an evolved Node B (eNodeB), a report message including a channel status and a video buffer status of the UE;
   receive, from the eNodeB, a modified bit rate determined based on the channel status and the video buffer status to be applied to the dynamic bearer and time information to which the modified bit rate is applied; and
   receive traffic through the dynamic bearer according to the modified bit rate for a time period corresponding to the time information,
wherein the modified bit rate is determined based on an amount of resources additionally allowed for the UE, the amount of resources is associated with a maximum bit rate and allowance time to which the maximum bit rate is applied, and the maximum bit rate is determined based on a capacity of the eNodeB, and
wherein a bit rate of the dynamic bearer is set, after the time period corresponding to the time information, from the modified bit rate to an average bit rate, wherein the average bit rate indicates an average guaranteed bit rate (GBR) available to a corresponding bearer and the average bit rate is determined based on a type of flow, a policy, and an user subscription.

10. The UE of claim 9, wherein the controller is configured to receive a bit rate to be applied to the dynamic bearer from the eNodeB when the time period corresponding the time information has elapsed; and to transmit the report message to the eNodeB when the channel status of the UE is greater than or equal to a preset value.

11. An evolved Node B (eNodeB) for dynamically operating a bearer in a wireless communication system comprising:
   a transceiver; and
   a controller coupled with the transceiver and configured to control to:
      set a dynamic bearer for user equipment (UE) where a bit rate is dynamically adjustable;
      receive a report message from the UE, the report message including a channel status and a video buffer status of the UE;
      determine a modified bit rate based on the channel status and the video buffer status to be applied to the dynamic bearer and time information to which the modified bit rate is applied; and
      transmit the modified bit rate and the time information to the UE,
   wherein the modified bit rate is determined based on an amount of resources additionally allowed for the UE, the amount of resources is associated with a maximum bit rate and allowance time to which the maximum bit rate is applied, and the maximum bit rate is determined based on a capacity of the eNodeB, and
   wherein a bit rate of the dynamic bearer is set, after a time period corresponding to the time information, from the modified bit rate to an average bit rate, wherein the average bit rate indicates an average guaranteed bit rate (GBR) available to a corresponding bearer and the average bit rate is determined based on a type of flow, a policy, and an user subscription.

12. The eNodeB of claim 11, wherein the controller is configured to:
   start a timer for the time period corresponding to the time information; and
   transmit a message for re-setting the bit rate of the dynamic bearer to the average bit rate to the UE when the time period of the timer has elapsed.

13. A user equipment (UE) for dynamically operating a bearer in a wireless communication system comprising:
   a transceiver; and
   a controller coupled with the transceiver and configured to control to:
      set a dynamic bearer where a bit rate is dynamically adjustable;
      detect a channel status and a video buffer status of the UE;
      determine a modified bit rate based on the channel status and the video buffer status to be applied to the dynamic bearer and time information to which the modified bit rate is applied; and
      transmit a bit rate modification request message to an evolved Node B (eNodeB), the bit rate modification request message including the determined modified bit rate and the time information,
   wherein the modified bit rate is determined based on an amount of resources additionally allowed for the UE, the amount of resources is associated with a maximum bit rate and allowance time to which the maximum bit rate is applied, and the maximum bit rate is determined based on a capacity of the eNodeB, and
   wherein a bit rate of the dynamic bearer is set, after a time period corresponding to the time information, from the modified bit rate to an average bit rate, wherein the average bit rate indicates an average guaranteed bit rate (GBR) available to a corresponding bearer and the average bit rate is determined based on a type of flow, a policy, and an user subscription.

14. The UE of claim 13, wherein the controller is configured to:
   receive an acknowledgement message in response to the bit rate modification request message from the eNodeB;
   receive traffic through the dynamic bearer according to a bit rate and time information included in the acknowledgement message; and
   receive a bit rate to be applied to the dynamic bearer from the eNodeB when the time period corresponding to the time information included in the acknowledgement message has elapsed.

15. An evolved Node B (eNodeB) for dynamically operating a bearer in a wireless communication system comprising:
   a transceiver; and
   a controller coupled with the transceiver and configured to control to:
      set a dynamic bearer for user equipment (UE) where a bit rate is dynamically adjustable;
      receive a bit rate modification request message from the UE, the bit rate modification request message including a channel status and a video buffer status of the UE;
      determine a modified bit rate and time information based on the channel status and the video buffer status; and
      transmit an acknowledgement message including the modified bit rate and the time information according to a result of the determination result to the UE,
   wherein the modified bit rate based on an amount of resources additionally allowed for the UE, the amount of resources is associated with a maximum bit rate and allowance time to which the maximum bit rate is applied, and the maximum bit rate is determined based on a capacity of the eNodeB, and
   wherein a bit rate of the dynamic bearer is set, after a time period corresponding to the time information, from the modified bit rate to an average bit rate, wherein the average bit rate indicates an average guaranteed bit rate (GBR) available to a corresponding bearer and the average bit rate is determined based on a type of flow, a policy, and an user subscription.

16. The eNodeB of claim 15, wherein the controller is configured to:
   determine whether to accept a bit rate modification request of the UE based on the maximum bit rate and the allowance time;
   start a timer for the time period corresponding to the time information; and
   transmit a message for re-setting the bit rate of the dynamic bearer to the average bit rate to the UE when the time period of the timer has elapsed.

* * * * *